United States Patent
Corrie

(10) Patent No.: US 11,550,513 B2
(45) Date of Patent: Jan. 10, 2023

(54) GLOBAL CACHE FOR CONTAINER IMAGES IN A CLUSTERED CONTAINER HOST SYSTEM

(71) Applicant: VMware, Inc., Palo Alto, CA (US)

(72) Inventor: Benjamin J. Corrie, Woodinville, WA (US)

(73) Assignee: VMware, Inc., Palo Alto, CA (US)

( * ) Notice: Subject to any disclaimer, the term of this patent is extended or adjusted under 35 U.S.C. 154(b) by 147 days.

(21) Appl. No.: 16/751,529

(22) Filed: Jan. 24, 2020

(65) Prior Publication Data

US 2021/0232344 A1    Jul. 29, 2021

(51) Int. Cl.
  *G06F 3/06* (2006.01)
  *G06F 9/455* (2018.01)
  *G06F 11/30* (2006.01)

(52) U.S. Cl.
  CPC .......... *G06F 3/0664* (2013.01); *G06F 3/0604* (2013.01); *G06F 3/067* (2013.01); *G06F 3/0644* (2013.01); *G06F 3/0659* (2013.01); *G06F 9/45558* (2013.01); *G06F 11/301* (2013.01); *G06F 2009/45562* (2013.01); *G06F 2009/45595* (2013.01)

(58) Field of Classification Search
  CPC .... G06F 3/0664; G06F 3/0604; G06F 3/0644; G06F 3/0659; G06F 3/067; G06F 9/45558; G06F 11/301; G06F 2009/45562; G06F 2009/45595
  See application file for complete search history.

(56) References Cited

U.S. PATENT DOCUMENTS

| | | | |
|---|---|---|---|
| 10,338,966 B2 * | 7/2019 | Chen | G06F 9/45558 |
| 2007/0245334 A1 * | 10/2007 | Nieh | G06F 9/45533 |
| | | | 717/168 |
| 2012/0109958 A1 * | 5/2012 | Thakur | G06F 16/21 |
| | | | 707/737 |

(Continued)

OTHER PUBLICATIONS

Ibryam et al. Kubernetes Patterns: Reusable Elements for Designing Cloud-Native Applications. [online] Red Hat., pp. 1-244. Retrieved From the Internet <https://arquitecturacloud.com/wp-content/uploads/2020/09/cm-oreilly-kubernetes-patterns-ebook-en.pdf> (Year: 2019).*

(Continued)

*Primary Examiner* — Emerson C Puente
*Assistant Examiner* — Jonathan R Labud
(74) *Attorney, Agent, or Firm* — Kim & Stewart LLP

(57) ABSTRACT

Container images are managed in a clustered container host system with a shared storage device. Hosts of the system each include a virtualization software layer that supports execution of virtual machines (VMs), one or more of which are pod VMs that have implemented therein a container engine that supports execution of containers within the respective pod VM. A method of deploying containers includes determining, from pod objects published by a master device of the system and accessible by all hosts of the system, that a new pod VM is to be created, creating the new pod VM, and spinning up one or more containers in the new pod VM using images of containers previously spun up in another pod VM, wherein the images of the containers previously spun up in the other pod VM are stored in the storage device.

18 Claims, 10 Drawing Sheets

(56) References Cited

U.S. PATENT DOCUMENTS

| | | | | |
|---|---|---|---|---|
| 2014/0025535 A1* | 1/2014 | Douglas | ............... | G06Q 10/063 705/26.8 |
| 2017/0132090 A1* | 5/2017 | Banerjee | ............... | G06F 3/0619 |
| 2017/0371693 A1 | 12/2017 | Corrie et al. | | |
| 2018/0203736 A1* | 7/2018 | Vyas | ..................... | G06F 9/5038 |
| 2021/0004712 A1* | 1/2021 | Sarferaz | ................... | G06N 5/04 |
| 2021/0092071 A1* | 3/2021 | Tortosa | ................... | G06F 9/505 |

OTHER PUBLICATIONS

Ernst, E. et al. "Kata Containers Architecture," GitHub, Inc., 2019, 22 pages, URL: https://github.com/kata-containers/documentation/blob/master/design/architecture.md.

VMWARE, Inc. "Overview of vSphere Integrated Containers," Product version: 1.5, 2019, 21 pages.

* cited by examiner

GLOBAL CACHE FOR CONTAINER IMAGES IN A CLUSTERED CONTAINER HOST SYSTEM

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts It offers flexibility in application development and offers several useful tools for scaling.

In a Kubernetes system, containers are grouped into a logical unit gilled a "pod." Containers in the same pod share the same resources and network, and maintain a degree of isolation from containers in other pods. The pods are distributed across nodes of the Kubernetes system and an image cache is provided on each node to speed up pod deployment. However, when an instance of the same pod is deployed across multiple nodes, and none of the image caches of the nodes have the images of containers that are in the pod, the network can become saturated during the deployment.

In addition, the image caches in a Kubernetes system are opaque to the user. Without a view into which images are cached on which nodes, it is not possible to know how quickly pods can be deployed on a node. Thus, the deployment time for a pod becomes non-deterministic because some nodes may have the images cached and some nodes may not. As a result, it can be difficult to make appropriate scheduling decisions.

Over time, duplication of cached images across nodes may also result. Because the image binaries are generally not small, the amount of disk space consumed by them can become very large, e.g., N×their size when they are cached on N nodes. Accordingly, pre-seeding of the images in the image cache of each node in a Kubernetes system, which has been employed as a solution to alleviate the network saturation and scheduling problems noted above, is far from ideal because this may result in duplication of images in each cache, which would be wasteful.

SUMMARY

Container images are managed in a clustered container host system with a shared storage device. Hosts of the system each include a virtualization software layer that supports execution of virtual machines (VMs), one or more of which are pod VMs that have implemented therein a container engine that supports execution of containers within the respective pod VM.

A method of deploying containers in the clustered container host system, according to an embodiment, includes the steps of: determining, from pod objects published by a master device of the clustered container host system and accessible by all hosts of the clustered container host system, that a new pod VM is to be created; creating the new pod VM; and spinning up one or more containers in the new pod VM using images of containers previously spun up in another pod VM, wherein the images of the containers previously spun up in the other pod VM are stored in the storage device.

Further embodiments include a non-transitory computer-readable storage medium comprising instructions that cause a computer system to carry out the above methods, as well as a computer system configured to carry out the above methods.

DETAILED DESCRIPTION

Figure 1:
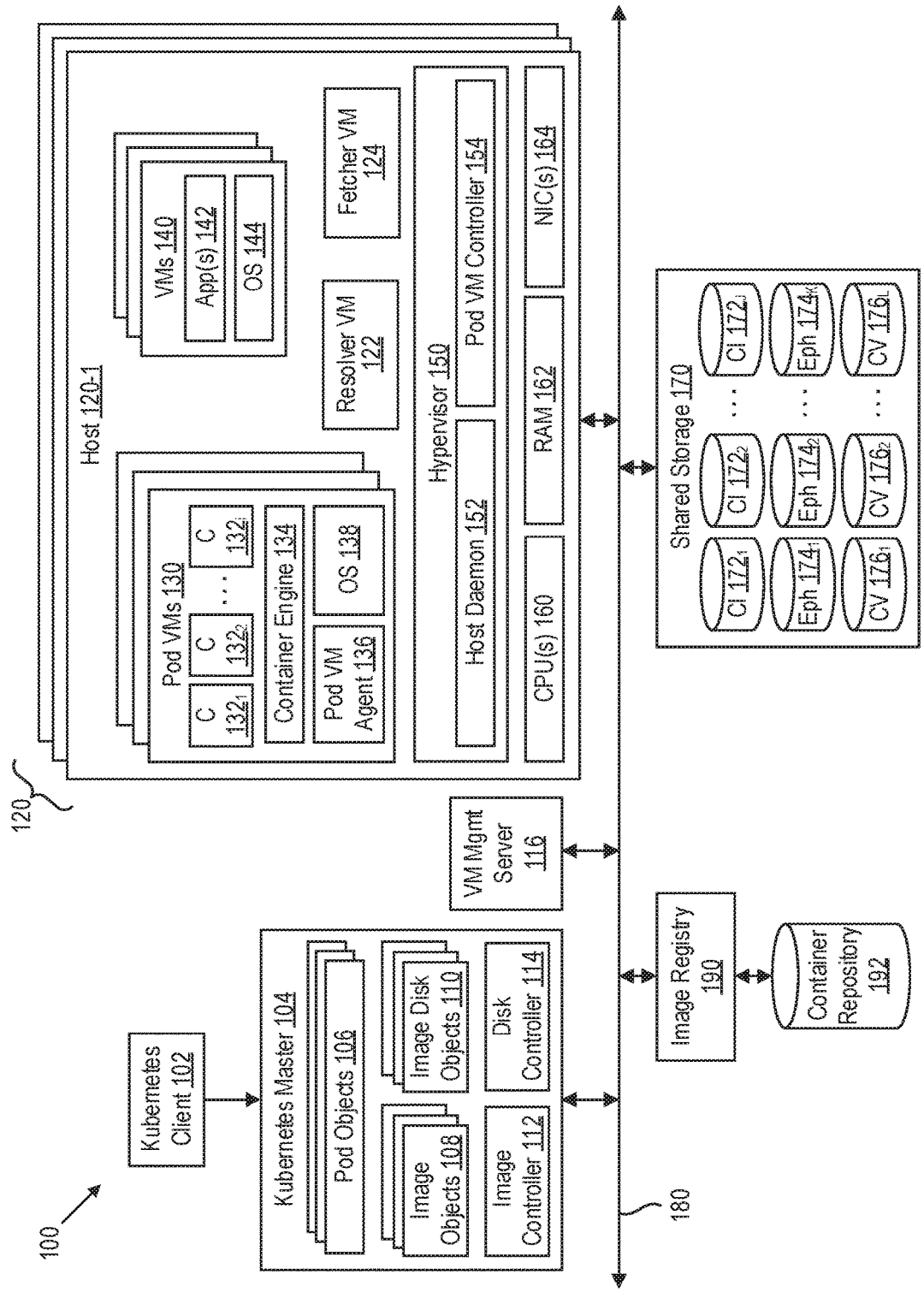
FIG. 1 is a block diagram of a clustered container host system in which embodiments may be implemented.

FIG. 1 is a block diagram of a clustered container host system 100 in which embodiments may be implemented. System 100 includes a cluster of hosts 120 which may be constructed on a server grade hardware platform such as an x86 architecture platform. The hardware platform includes one or more central processing units (CPUs) 160, system memory (e.g., random access memory (RAM) 162, and one or more network interface controllers (NICs) 164. A virtualization software layer, also referred to herein as a hypervisor 150, is installed on top of the hardware platform. The hypervisor supports a virtual machine execution space within which multiple VMs may be concurrently instantiated and executed. As shown in FIG. 1, the VMs that are concurrently instantiated and executed in host 120-1 includes pod VMs 130, VMs 140, resolver VM 122, and fetcher VM 124. The functions of resolver VM 122 and fetcher VM 124 will be described below. In addition, all of hosts 120 are configured in a similar manner as host 120-1 and they will be separately described as needed.

In the embodiment illustrated by FIG. 1, hosts 120 access shared storage 170 by using their NICs 164 to connect to a network 180. In another embodiment, each host 120 contains a host bus adapter (HBA) through which input/output operations (I/Os) are sent to shared storage 170. Shared storage 170 may comprise, e.g., magnetic disks or flash memory in a storage area network (SAN). In some embodiments, hosts 120 also contain local storage devices (e.g., hard disk drives or solid-state drives), which may be aggregated and provisioned as a virtual SAN device.

VM management server 116 is a physical or virtual server that provisions pod VMs 130, VMs 140, resolver VMs 122, and fetcher VMs 124 from the hardware resources of hosts 120 and shared storage 170. VM management server 116 logically groups hosts 120 into a cluster to provide cluster-level functions to hosts 120, such as load balancing across hosts 120 by performing VM migration between hosts 120, distributed power management, dynamic VM placement according to affinity and anti-affinity rules, and high-availability. The number of hosts 120 in the cluster may be one or many. Each host 120 in the cluster has access to shared storage 170 via network 180. VM management server 116 also communicates with shared storage 170 via network 180 to perform control operations thereon.

Kubernetes master 104 is a physical or virtual server that manages Kubernetes pod objects 106, image objects 108, and image disk objects 110, and includes image controller 112, and disk controller 114. Image objects 108 and image disk objects 110 will be further described below. The functions of image controller 112 and disk controller 114 will be described in conjunction with FIG. 2. Kubernetes master 104 communicates with pod VM controllers 154 installed in hosts 120 via network 180.

Kubernetes client 102 represents an input interface for an application administrator or developer (hereinafter referred to as the "user"). It is commonly referred to as kubectl. Through Kubernetes client 102, the user submits desired states of the Kubernetes system, e.g., as YAML documents, to Kubernetes master 104. In response, Kubernetes master 104 schedules pods onto (i.e., assigns them to) different hosts 120 (which are also nodes of a Kubernetes cluster in the embodiments), and updates the status of pod objects 106. The pod VM controllers of the different hosts 120 periodically poll Kubernetes master 104 to see if any of the pods have been scheduled to the node (in this example, the host) under its management and execute tasks to bring the actual state of the pods to the desired state as further described below.

A hypervisor 150 includes a host daemon 152 and a pod VM controller 154. Host daemon 152 communicates with VM management server 116 to instantiate pod VMs 130, VMs 140, resolver VM 122, and fetcher VMs 124. Pod VM controller 154 manages the lifecycle of pod VMs 130 and determines when to spin up or delete a pod VM.

Each pod VM 130 has one or more containers 132 running therein in an execution space managed by container engine 134. The lifecycle of containers 132 is managed by pod VM agent 136. Both container engine 134 and pod VM agent 136 run on top of an operating system (OS) 138.

Each VM 140 has applications 142 running therein on top of an OS 144. In the embodiment illustrated in FIG. 1, resolver VM 122 and fetcher VM 124 are also VMs with operating systems. Resolver VM 122 performs image resolution, which will be further described below in conjunction with FIG. 4. Fetcher VM 124 performs image fetching, which will be further described below in conjunction with FIGS. 7A and 7B.

Each of containers 132 has a corresponding container image (CI) stored as a read-only virtual disk in shared storage 170. These read-only virtual disks are referred to herein as CI disks and depicted in FIG. 1 as CI $172_{1-J}$. Additionally, each pod VM 130 has a virtual disk provisioned in shared storage 170 for reads and writes. These read-write virtual disks are referred to herein as ephemeral disks and are depicted in FIG. 1 as Eph $174_{1-k}$. When a pod VM is deleted, its ephemeral disk is also deleted. In some embodiments, ephemeral disks can be stored on a local storage of a host because they are not shared by different hosts. Container volumes are used to preserve the state of containers beyond their lifetimes. Container volumes are stored in virtual disks depicted in FIG. 1 as CV $176_{1-J}$.

Container images are registered with image registry 190, which manages a plurality of container repositories (one of which is shown in FIG. 1 as container repository 192) in which images of all containers registered with image registry 190 are stored. During registration of a container image, image registry 190 collects authentication information and during subsequent requests to access the registered container images, authenticates the requester using the collected authentication information. Once the requester is authenticated, image registry 190 permits the requester to fetch the container images registered to the requester.

In the embodiments illustrated herein, "namespaces" are created and used to divide resources, e.g., pod VMs, between multiple users. For example, a pod VM A in a namespace of one user may be authorized to use a CI X that is registered to that user. On the other hand, a pod VM B in a namespace of a different user may not be authorized to use CI X.

Image objects 108 and image disk objects 110 are metadata constructs used in managing retrieval of container images. An image object 108 contains an image disk object pointer, e.g., a pointer to one of image disk objects 110. An image disk object 110 contains a CI disk pointer, e.g., a pointer to one of CI disks 172. Image objects 108 exist at a namespace level. This means that image objects 108 of one user are different from image objects 108 of another user. In contrast, image disk objects 110 exist at a cluster level. This means that image disk objects 110 of one cluster are different from image disk objects 110 of another cluster. However, different namespaces in the same cluster all have access to image disk objects 110 of that cluster. Because each cluster may contain multiple namespaces, there could be a many-to-one relationship from image objects 108 to image disk objects 110. By contrast, because CI disks 172 also exist at the cluster level, image disk objects 110 and CI disks 172 have a one-to-one relationship.

In addition to a CI disk pointer, an image disk object 110 contains the following metadata: chain ID, size, error, and status. A chain ID is an image disk object 110's index and is also a unique identifier of the contents of the CI (that is stored in the CI disk that the CI disk pointer is referencing). Image registry 190 generates a chain ID for a CI by hashing the CI's contents. For example, image registry 190 may input an uncompressed CI to a secure hash algorithm (SHA), e.g., SHA-256, and use the output as a chain ID. The size field corresponds to the uncompressed size of the CI plus space for file system metadata. The error field is populated if the image disk object 110's cluster cannot use the image disk object 110 to access the CI. If populated, the error field consists of a string explaining the issue. The issue may be, e.g., that the value for the size field is too small for a CI disk 172 to store the CI.

In the embodiments described herein, an image disk object 110's state may be one of four values: "allocating," "pulling," "ready," or "stale." An image disk object 110 is in the "allocating" state before a CI disk 172 exists for storing the CI corresponding to the image disk object 110's chain ID. After a resolver VM 122 (further described below) works out how big CI disk 172 needs to be and the chain ID that will be used as the index for the CI, and determines whether the user is authorized to pull the CI, VM management server 116 creates a CI disk 172 for the CI and image disk object 110 transitions to the "pulling" state. Fetcher VM 124 will then contact image registry 190 to extract the CI from container repository 192 onto CI disk 172. An image disk object 110 transitions to the "ready" state, which is an indication that CI disk 172 can be attached and mounted to a pod VM 130. When CI disk 172 is attached and mounted to pod VM 130, container engine 134 is able to read the contents of CI disk 172 and spin up container 132. An image disk object 110 transitions to the "stale" state once a cluster is unable use that image disk object 110 to access the CI. This inability may result from an error fetching the CI or from there being no image objects 108 pointing to the image disk object 110. Either way, an administrator is allowed to delete a "stale" image disk object 110. Alternatively, a "stale" image disk object 110 may be deleted automatically, e.g., by garbage collection process described below.

In addition to an image disk object pointer, an image object 108 contains the following metadata: uniform resource identifier (URI), chain ID, size, error, and state. A URI is an image object 108's index and a URI contains: image registry 190's address, container repository 192's ID, a container 132 name, and a tag. Different tags may correspond to different versions of the same CI within the same namespace. An image object 108's chain ID is that of the image disk object 110 that the image object 108 points to. As with image disk objects 110, an image object 108's size field is the uncompressed size of the CI plus space for file system metadata. The error field is populated if pod VMs 130 in the image object 108's namespace cannot use the image object 108 to access a CI. If populated, the error field consists of a string explaining the issue. The issue may be, e.g., that pod VMs 130 in the image object 108's namespace is not authorized to access the CI associated with the image object 108's URI.

In the embodiments described herein, an image object 108's state may be one of five values: "created," "resolving," "fetching," "ready," or "failed." An image object 108 is in the "created" state upon creation in its respective namespace. An image object 108 transitions to the "resolving" state once a pod VM controller of any of hosts 120 finds an image object 108 that needs to be resolved. Multiple pod VM controllers of hosts 120 will race to transition image object 108 to the "resolving" state and the first to successfully transition image object 108 to the "resolving" state will launch a resolver VM to carry out the resolving task, which is further described below. An image object 108 transitions to the "fetching" state once it points to an image disk object 110 that is in the "allocating" or "pulling" state. An image object 108 transitions to the "ready" state once it points to an image disk object 110 that is in the "ready" state. An image object 108 transitions to the "failed" state when pod VM 130 is not authorized to access the CI, e.g., as a result of authentication failure with image registry 190 or if some other error occurs. An administrator is allowed to delete image object 108 of the administrator's namespace in the "failed" state. In fact, the administrator is allowed to delete image objects 108 of the administrator's namespace in any state at any time.

Figure 2:
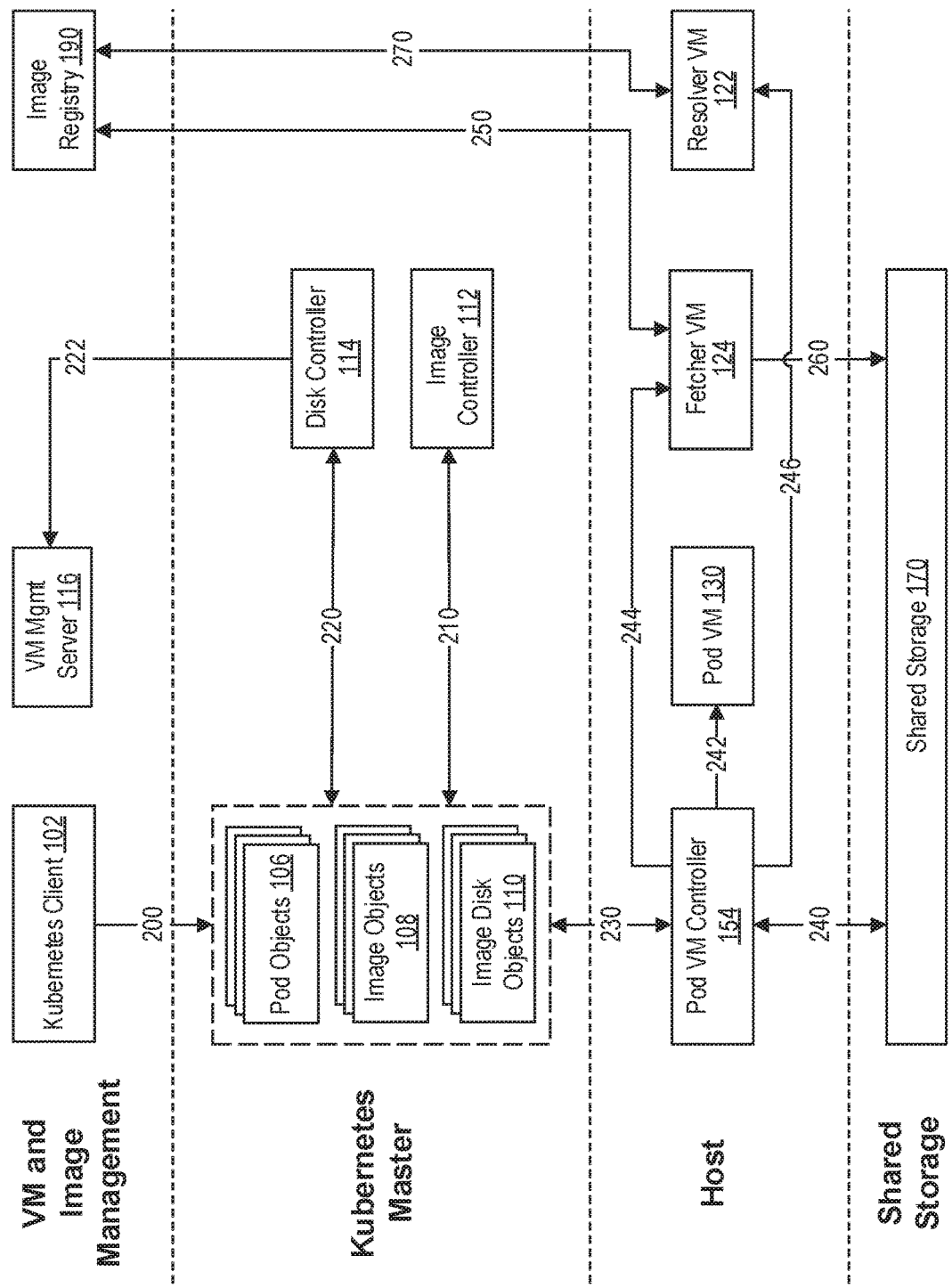
FIG. 2 is a block diagram illustrating how components at different conceptual levels of the present invention may interact according to embodiments.

FIG. 2 is a block diagram illustrating how components at different conceptual levels may interact according to embodiments. FIG. 2 consists of four conceptual levels: a VM and image management layer, a Kubernetes master layer, a host layer, and a shared storage layer.

Depicted at the VM and image management layer are Kubernetes client 102, VM management server 116, and image registry 190. Arrow 200 represents Kubernetes client 102 sending a request to Kubernetes master 104.

Depicted at the Kubernetes master layer level are pod objects 106, image objects 108, image disk objects 110, image controller 112, and disk controller 114. Arrow 210 represents image controller 112 performing tasks to manage image objects 108 and image disk objects 110. The first task is managing lifecycles of image object 108, including creating image objects 108. The second task is creating image disk objects 110. The third task is binding image objects 108 with image disk object pointers. The fourth task is reconciling image object 108 states with image disk object 110 states. State reconciliation will be described below in conjunction with FIG. 8. Arrow 220 represents disk controller 114 performing tasks to manage image disk objects 110 and CI disks 172. The first task is managing CI disk 172 lifecycles, including deciding when to create or delete a CI disk 172. The second task is binding image disk objects 110 to point to CI disks 172. Arrow 222 represents disk controller 114 transmitting a request for VM management server 116 to either create or delete a CI disk 172.

Depicted at the host layer level are pod VM controller 154, pod VM 130, fetcher VM 124, and resolver VM 122, Arrow 230 represents pod VM controller 154 monitoring and managing pod objects 106, image objects 108, and image disk objects 110.

Depicted at the shared storage layer level is shared storage 170. Arrow 240 represents pod VM controller 154 transmitting a request to shared storage 170 to access a CI disk 172. Shared storage 170 in response to this request transmits a reference to the CI disk 172 to pod VM controller 154. Arrow 242 represents pod VM controller 154 attaching and mounting a CI disk 172 to pod VM 130. CI disk 172 is then accessible to container engine 134 for spinning up containers 132. Arrow 244 represents pod VM controller 154 launching an image fetching task by passing a CI disk pointer, image URI and registry credentials to fetcher VM 124. Arrow 246 represents pod VM controller 154 launching an image resolving task by passing an image URI and registry credentials to resolver VM 122. Arrow 250 represents fetcher VM 124 beginning an image fetching task by authenticating with the image registry 190 and requesting the CI. Image registry 190 in response to successful authentication verifies whether the namespace user is authorized to access the CI referenced by the URI and if so, retrieves the CI from container repository 192 and transmits the CI to fetcher VM 124. Arrow 260 represents fetcher VM 124 formatting a CI disk 172 and storing the CI therein. Arrow 270 represents resolver VM 122 beginning an image resolving task by authenticating with the image registry 190 and inspecting the CI. Image registry 190 in response to successful authentication verifies whether the namespace user is authorized to access the CI referenced by the URI and, if so, computes a chain ID and transmits the chain ID to resolver VM 122.

When a user requests a container to be spun up in a pod VM, three possible situations may arise. The first situation is that there is no CI disk for that container. The first situation will be referred to herein as a "cache miss." The second situation is that a CI disk for that container exists, but the pod VM is in a namespace which has yet to resolve the CI with the image registry 190. The second situation will be referred to herein as a "partial cache hit." The third situation is that a CI disk for that container exists, and the pod VM is in the namespace that already has an image object for the CI. The third situation will be referred to herein as a "full cache hit."

When a cache miss occurs, image controller 112 creates a new image object in the namespace. Resolver VM 122 then authenticates and resolves the image URI with image registry 190 and if successful, returns a chain ID. Image controller 112 then creates a new image disk object for the chain ID. Disk controller 114 causes VM management server 116 to create a CI disk of a size specified by the resolver VM 122. Fetcher VM 124 retrieves the container image and stores the container image in the CI disk. Then, pod VM controller 154 attaches and mounts the CI disk to the pod VM so that the container can be executed in the pod VM.

A partial cache hit may occur for multiple reasons. For example, an image with the same URI exists in a different namespace, or an image with a different URI that resolves to the same chain ID exists in the same namespace. Additionally, image controller 112 may have previously created an image object corresponding to the CI, but image controller 112 may have now created a different URI for the CI with a different tag. When a partial cache hit occurs, the CI does not need to be fetched again from image registry 190; image controller 112 merely needs to create a new image object and have resolver VM 122 authenticate, retrieve the chain ID and bind the new image object to an existing image disk object.

When a full cache hit occurs, pod VM controller 154 can use the existing image object and image disk object to attach and mount the existing CI disk to the pod VM.

Figure 3:
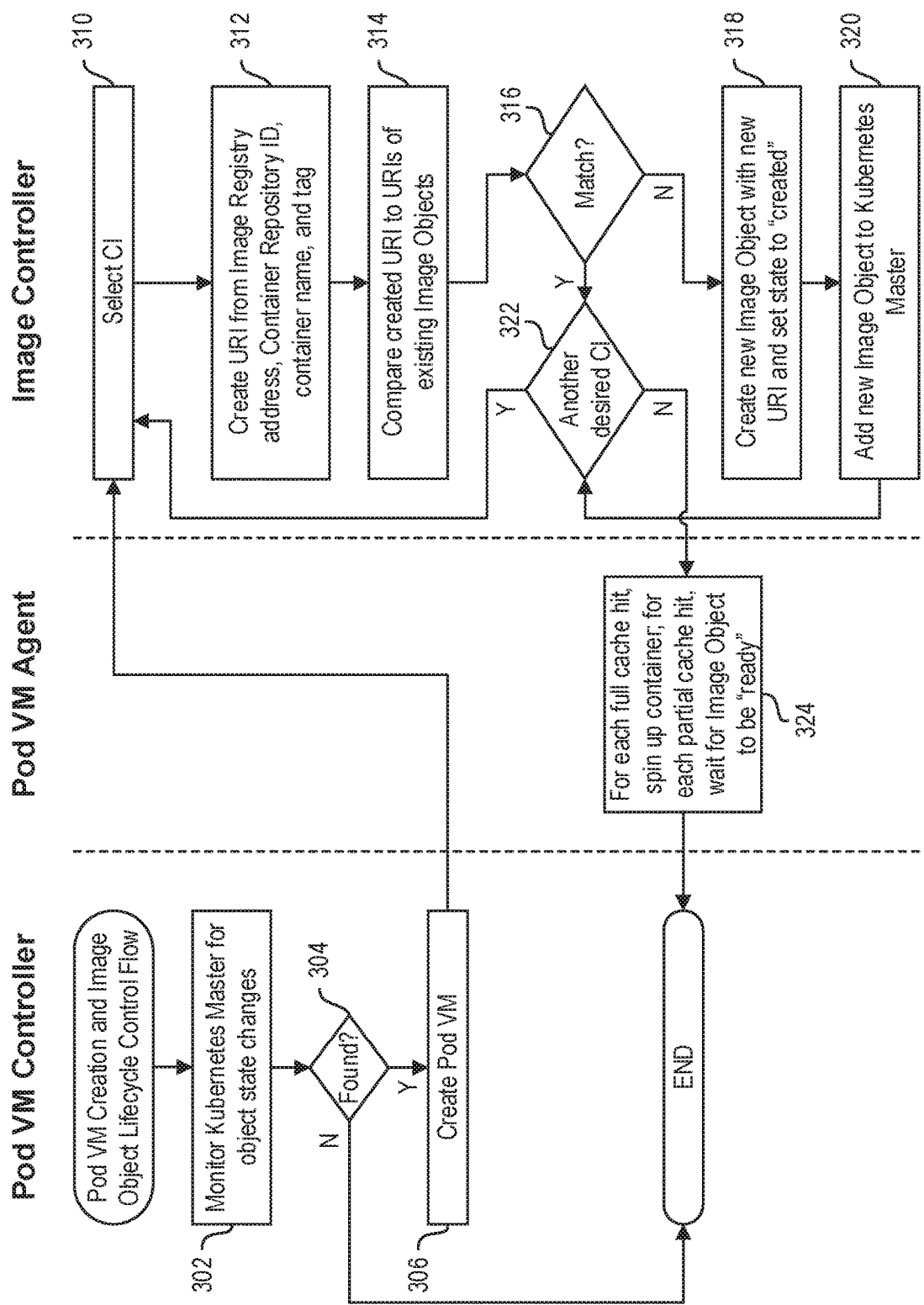
FIG. 3 is a flow diagram illustrating a process of creating pod VMs and managing image object lifecycles according to embodiments.

FIG. 3 is a flow diagram illustrating the process of creating pod VMs 130 and managing image object lifecycles according to embodiments. Step 302 represents pod VM controller 154 monitoring Kubernetes master 104 for a pod object that has been assigned thereto. Any such pod object specifies the name of the pod VM to be instantiated, the names of containers to be spun up in the pod VM, and for each such container, address of the image registry and the ID of the container repository in which the container image is stored and any tag. At step 304, if pod VM controller 154 did not find any such pod object, then the process ends. If pod VM controller 154 did find such a pod object, then the process moves to step 306.

At step 306, host daemon 152 in hypervisor 150 creates the pod VM specified by task. Then, at step 310, image controller 112 selects the first container image (of the container images to be spun up in the pod VM) specified in the pod object. At step 312, image controller 112 creates a URI from the image registry address, container repository ID, container name, and tag specified in the pod object. At step 314, image controller 112 compares the newly created URI to URIs of existing image objects 108 in Kubernetes master 104.

At step 316, if image controller 112 did not find an image object with the same URI, then the process moves to step 318. On the other hand, if image controller 112 did find an image object with the same URI a "cache hit" is determined for that image object and the process moves to step 322.

At step 318 image controller 112 creates a new image object with the newly created URI from step 312. Image controller 112 sets the state of the new image object to "created." The "created" state indicates that the image object's URI has not yet been resolved to a chain ID, and that the image object is not yet pointing to an image disk object. After step 320, the process moves to step 322.

At step 322, if there is another container image specified in the pod object, the process moves back to step 310 and image controller 112 repeats steps 310-316 for the next container image. Otherwise, the process moves to step 324.

At step 324, pod VM agent 136 spins up the containers of those container images that have image objects that are in the "ready" state. For containers of the container images that have image objects that are not yet in the "ready" state, pod VM agent 136 waits for the image objects to transition into the "ready" state (in accordance with the control flow described bellow in conjunction with FIG. 5) before spinning up the containers. After step 324, the process ends.

In the control flow of FIG. 3 described above, a full cache hit for a container image occurs when a match is found in step 316 and the image object corresponding the container image is in the "ready" state. A partial cache hit for a container image occurs when a match is found in step 316 and the image object corresponding the container image is not in the "ready" state. A cache miss for a container image occurs when no match is found in step 316.

Figure 4:
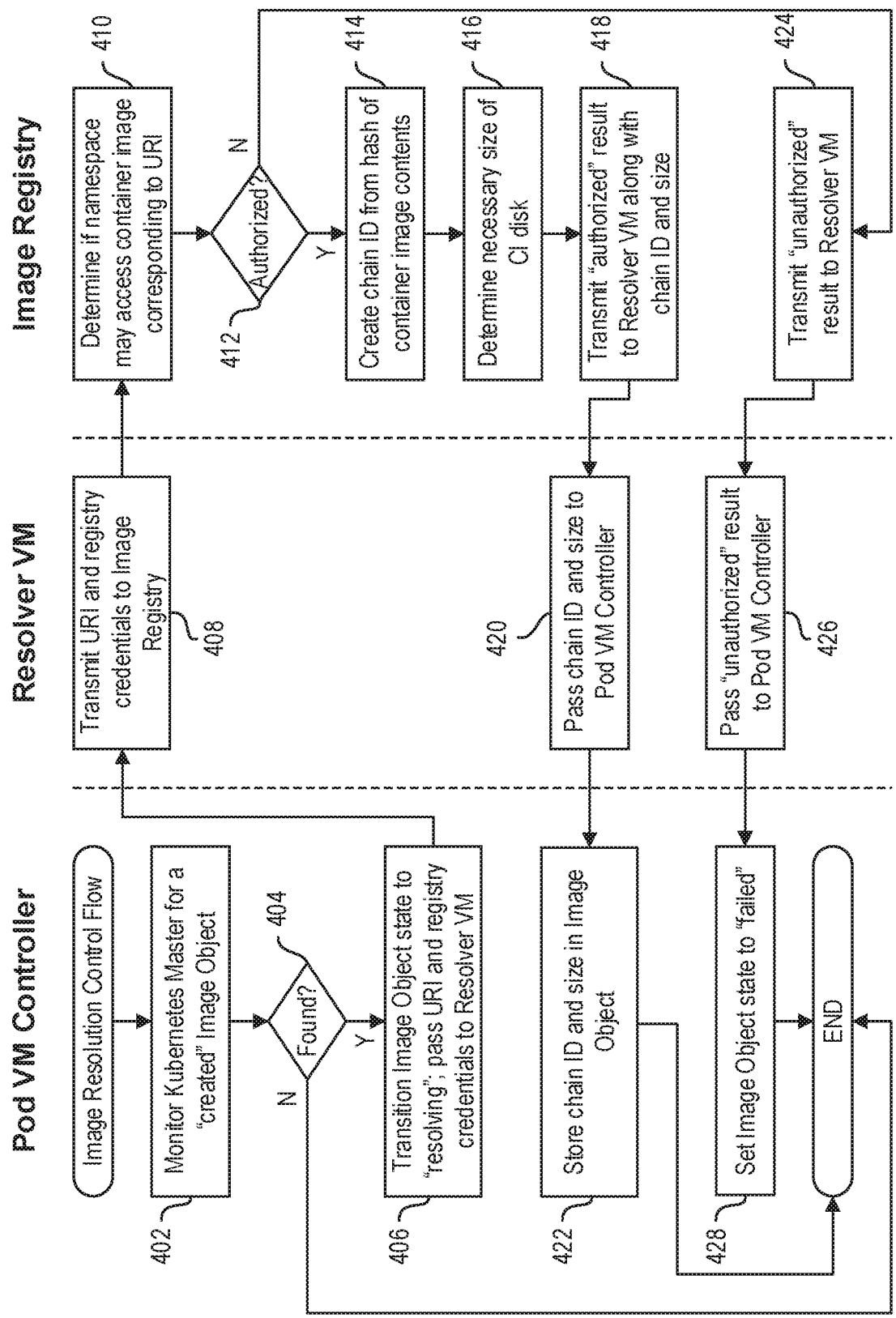
FIG. 4 is a flow diagram illustrating a process of resolving URIs to chain IDs according to embodiments.

FIG. 4 is a flow diagram illustrating the process of resolving URIs to chain IDs according to embodiments. Step 402 represents pod VM controllers of hosts 120 monitoring Kubernetes master 104 for a "created" image object (one of image objects 108 that are in the "created" state as a result of the control flow of FIG. 3 where a pod VM for a particular namespace has been instantiated). At step 404, if a pod VM controller found a "created" image object, then the process moves to step 406. Otherwise, the process ends.

At step 406, the pod VM controller transitions the image object to the "resolving" state (indicating the desired state of the image object, i.e., the state during which the image object's URI is to be resolved to a chain ID and the image controller 112 is to find or create an image disk with that chain ID), launches a resolver VM, and passes the image object's URI and registry credentials (associated with the namespace of the pod VM in which the container corresponding to the image object in the "created" state is to be spun up) to the resolver VM to begin image resolution. At step 408, the resolver VM transmits the URI and the registry credentials to image registry 190 over network 180.

At step 410, image registry 190 determines if the namespace corresponding to the registry credentials is authorized to access the container image corresponding to the transmitted URI. For example, image registry 190 may contain a list of authorized namespaces for each container image in container repository 192. At step 412, if the namespace is authorized, then the process moves to step 414. Otherwise, the process moves to step 424.

At step 414, image registry 190 accesses the contents of the container image from container repository 192. Image registry 190 then hashes the contents of the container image to create a chain ID. At step 416, image registry 190 determines the size required for a CI disk 172 to fit the container image along with the container image's metadata. At step 418, image registry 190 transmits the result "authorized" to the resolver VM along with the chain ID and size from steps 414 and 416.

At step 420, the resolver VM passes the chain ID and size to the pod VM controller. At step 422, the pod VM controller stores the chain ID and size in the image object. After step 422, the process ends.

At step 424, because the namespace of the transmitted namespace ID is not authorized to access the container image corresponding to the transmitted URI the requested container image, image registry 190 transmits the result "unauthorized" to resolver VM 122. At step 426, resolver VM 122 passes the result "unauthorized" to the pod VM controller.

At step 428, the pod VM controller sets the state of the image object to "failed." The failed state is an indication that the image object is not authorized to access the container image corresponding to the image object's URI, or an indication of other issues, e.g., shared storage 170 is out of space or network issues. After step 428, the process ends.

Figure 5:
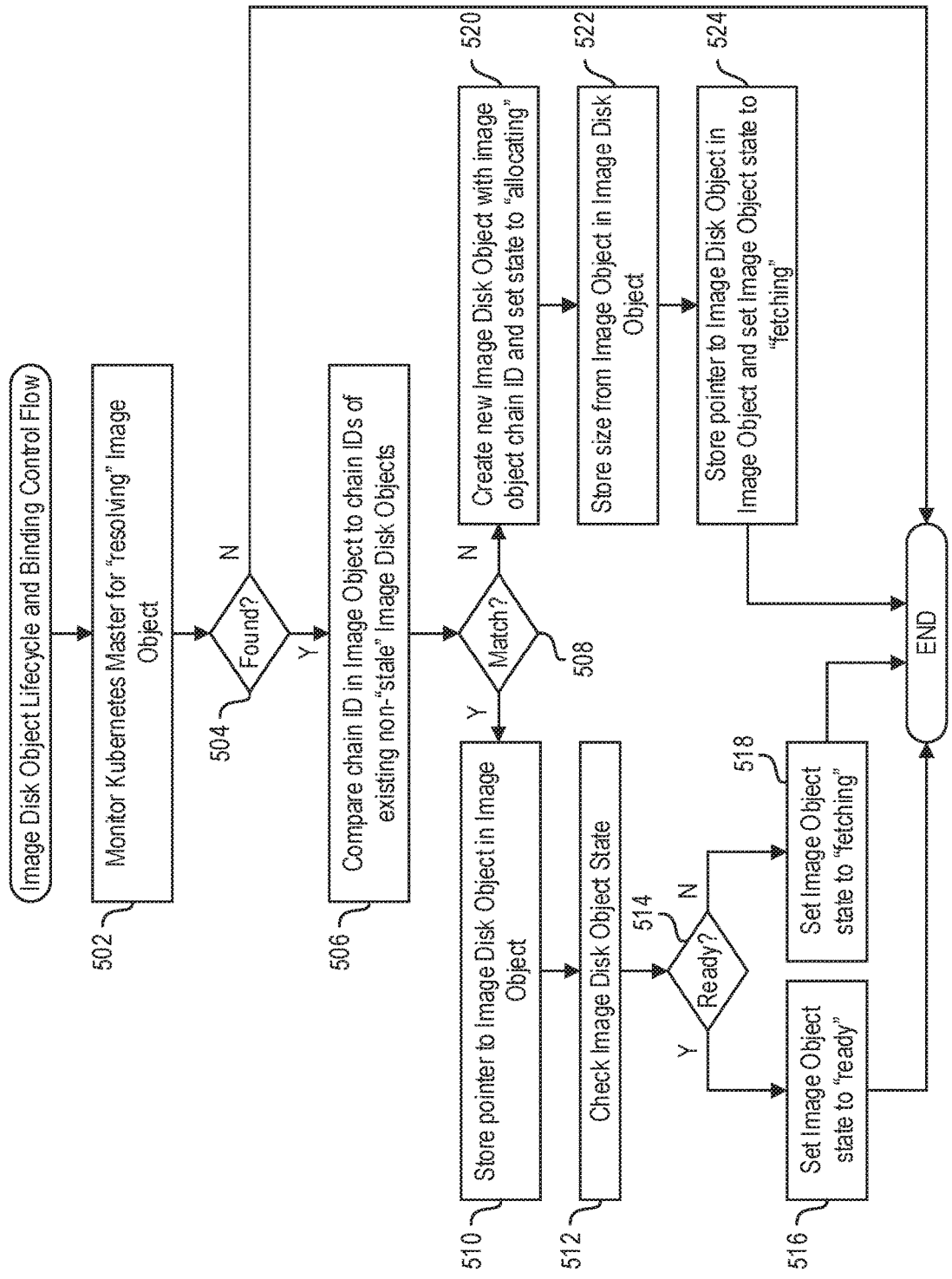
FIG. 5 is a flow diagram illustrating a process of managing image disk object lifecycles and binding image objects to image disk objects according to embodiments.

FIG. 5 is a flow diagram illustrating a process of managing image disk object 110 lifecycles and binding image objects 108 to image disk objects 110 according to embodiments. Image controller 112 performs the steps of FIG. 5.

Step 502 represents image controller 112 monitoring Kubernetes master 104 for a "resolving" image object (i.e., one of image objects 108 in the "resolving" state). At step 504, if image controller 112 found a "resolving" image object, then the process moves to step 506. Otherwise, the process ends.

At step 506, image controller 112 compares the chain ID in the image object to the chain IDs of image disk objects 110 in Kubernetes master 104. Image controller 112 only uses image disk objects 110 that are not "stale" in this comparison. At step 508, if image controller 112 found a match, then the process moves to step 510. Otherwise, the process moves to step 520.

At step 510, image controller 112 stores a pointer to the matching image disk object in the image object. At step 512, image controller 112 checks the image disk object's state. At step 514, if the image disk object's state is "ready," then the process moves to step 516. Otherwise, the process moves to step 518.

If the image disk object's state is "ready," image controller 112 at step 516 sets the image object's state to "ready." The image object's "ready" state is an indication that the image object is pointing to an image disk object (which further points to a CI disk 172 that actually stores the container image). After step 516, the process ends.

If the image disk object's state is not "ready," image controller 112 at step 518 sets the image object's state to "fetching." The "fetching" state is an indication that the image object is pointing to an image disk object, and the image disk object is either not pointing to a CI disk 172 or pointing to an empty CI disk 172. After step 518, the process ends.

If image controller 112 did not find an image disk object with a matching chain ID at step 508, image controller 112 at step 520 creates a new image disk object. Image controller 112 sets the chain ID of the image disk object to the chain ID stored in the image object. Image controller 112 also sets the state of the image disk object to "allocating," indicating that the image disk object is not yet pointing to a CI disk 172 or is pointing to an empty CI disk 172.

At step 522, image controller 112 stores the size from the image object in the newly created image disk object. VM management server 116 determines how large of a CI disk 172 to create from this size information. At step 524, image controller 112 stores a pointer to the newly created image disk object in the image object and sets the image object's state to "fetching." The "fetching" state is an indication that the image object is pointing to an image disk object and the image disk object is either not pointing to a CI disk 172 or pointing to an empty CI disk 172. After step 524, the process ends.

Figure 6:
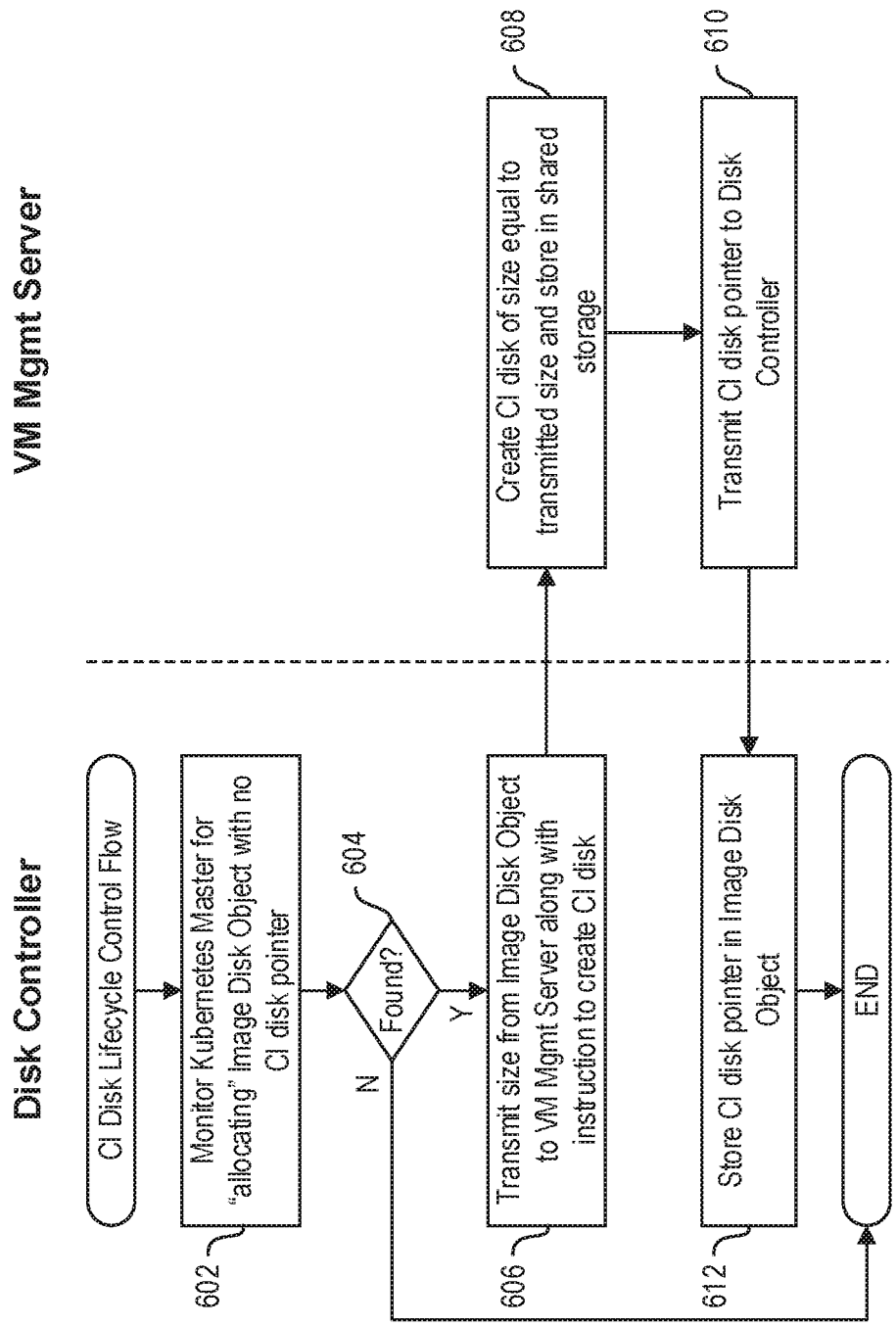
FIG. 6 is a flow diagram illustrating a process of managing container image disk lifecycles according to embodiments.

FIG. 6 is a flow diagram illustrating a process of managing lifecycles of CI disks 172 according to embodiments. Step 602 represents disk controller 114 monitoring Kubernetes master 104 for an "allocating" image disk object (i.e., an image disk object in the "allocating" state) with no CI disk pointer. At step 604, if disk controller 114 found such an image disk object, then the process moves to step 606. Otherwise, the process ends.

At step 606, disk controller 114 transmits the size value from the image disk object to VM management server 116 along with an instruction to create a CI disk. At step 608, VM management server 116 creates the CI disk of the size received from disk controller 114 in shared storage 170. At step 610, VM management server 116 transmits a pointer to the created CI disk to disk controller 114.

At step 612, disk controller 114 stores the CI disk pointer in the image disk object. After step 612, the process ends.

Figure 7A:
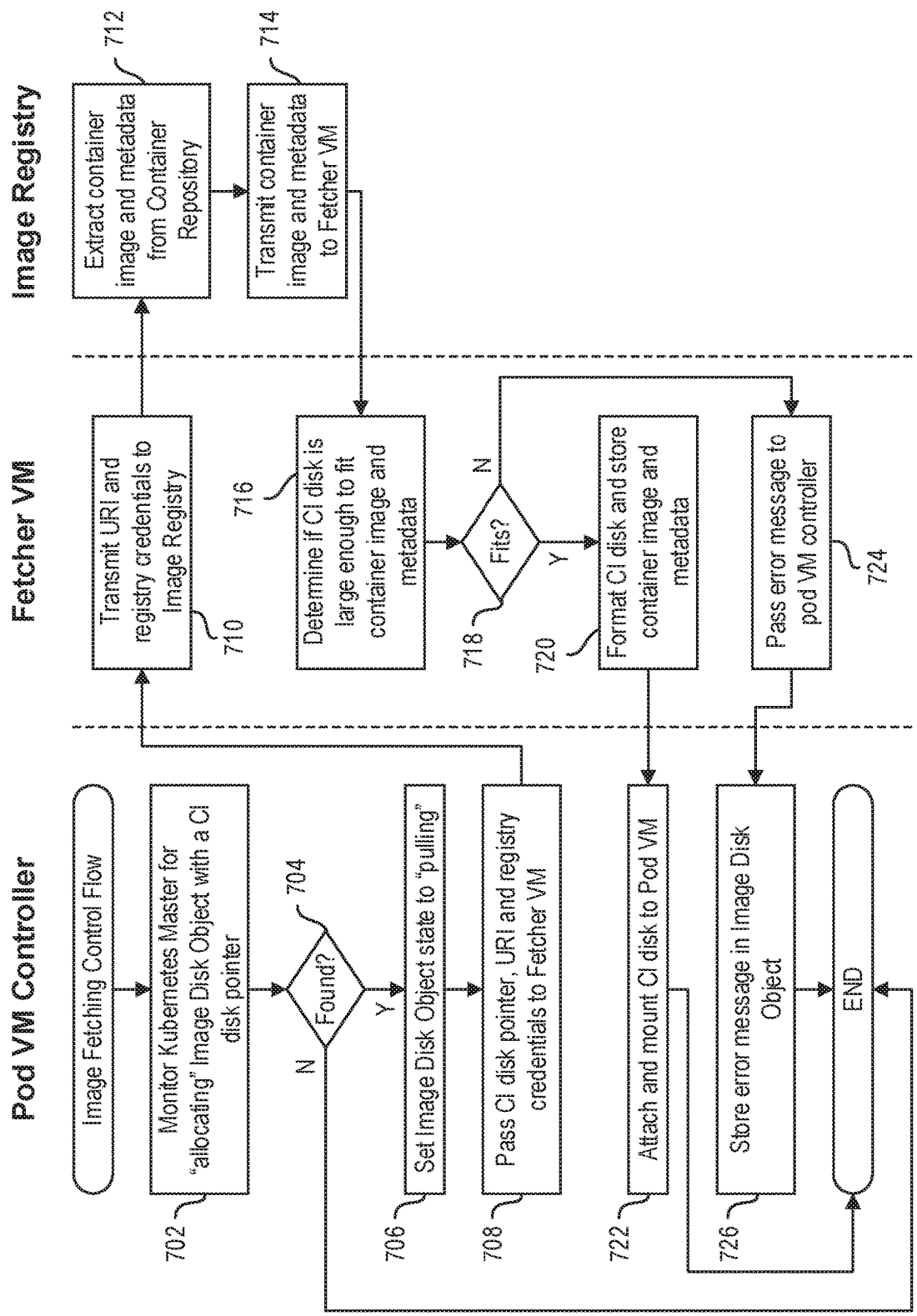
FIG. 7A is a flow diagram illustrating a process of fetching container images and mounting container image disks to pod VMs according to embodiments.

FIG. 7A is a flow diagram illustrating a process of fetching CIs and mounting CI disks 172 to pod VMs 130 according to embodiments. Step 702 represents pod VM controllers of hosts 120 monitoring Kubernetes master 104 for an "allocating" image disk object (i.e., an image disk object in the "allocating" state) with a CI disk pointer. Such an image disk object points to an empty CI disk. At step 704, if a pod VM controller found such an image disk object, then the process moves to step 706. Otherwise, the process ends.

At step 706, the pod VM controller changes the image disk object's state to "pulling." The "pulling" state is an indication that the pod VM controller has launched an image fetching task for the image disk object. At step 708, the pod VM controller launches a fetcher VM and passes the image object's CI disk pointer, URI, and registry credentials to the fetcher VM.

At step 710, the fetcher VM transmits the URI and registry credentials to image registry 190 over network 180. At step 712, image registry 190 extracts the CI corresponding to the URI from container repository 192. Image registry 190 also extracts the corresponding CI metadata. At step 714, image registry 190 transmits the CI and CI metadata to the fetcher VM.

At step 716, the fetcher VM determines if the empty CI disk is large enough to fit the CI and CI metadata. If the empty CI disk is large enough as determined at step 718, then the process moves to step 720. Otherwise, the process moves to step 724.

At step 720, the fetcher VM formats the empty CI disk and stores the CI and metadata on the CI disk. At step 722, the pod VM controller attaches and mounts the CI disk to pod VM 130. After step 722, the process ends.

At step 724, because the CI and CI metadata cannot fit in the empty CI disk, the fetcher VM passes an error message to the pod VM controller. The error message is a string indicating that the empty CI disk is too small and indicating the size the fetcher VM needs to fit the CI and CI metadata. At step 726, the pod VM controller stores the error message in the image disk object. After step 726, the process ends.

Figure 7B:
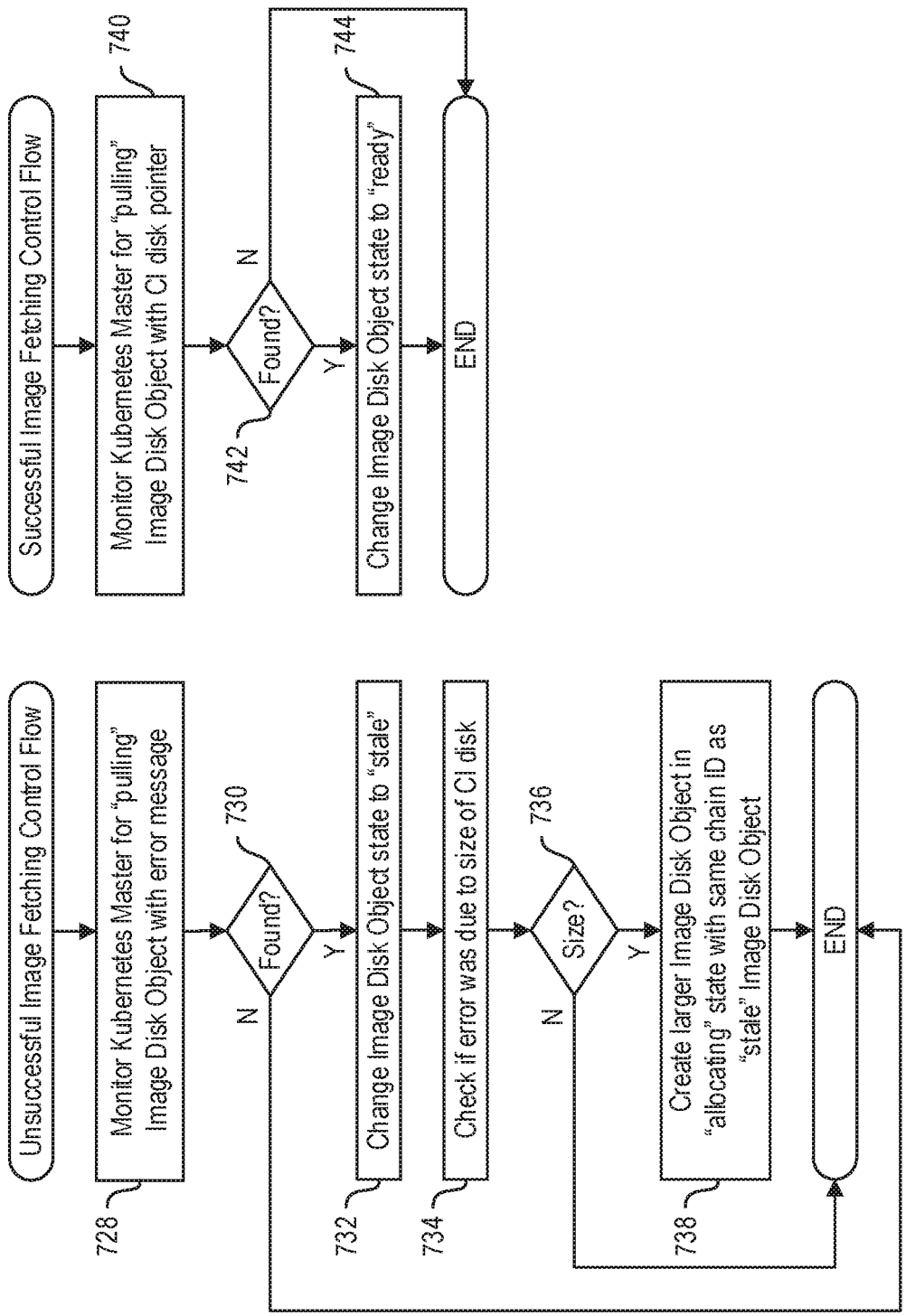
FIG. 7B is a group of flow diagrams illustrating processes of updating image disk objects in response to both successful and unsuccessful container image fetches according to embodiments.

FIG. 7B depicts two flow diagrams illustrating processes of updating image disk objects 110 in response to both successful and unsuccessful image fetches according to embodiments. Image controller 112 performs the steps of FIG. 7B.

At step 728, image controller 112 monitors Kubernetes master 104 for a "pulling" image disk object (i.e., an image disk object in the "pulling" state) containing an error message. If image controller 112 found such an image disk object at step 730, it is determined that the image fetching task failed and the process moves to step 732. Otherwise, the process ends.

At step 732, image controller 112 changes the image disk object's state to "stale." Then, at step 734, image controller 112 checks the "stale" image disk object's error message to determine if the error was that the size was too small to fit a CI and CI metadata.

At step 736, if the error was due to size, then the process moves to step 738. Otherwise, the process ends. Image controller 112 at step 738 creates a new image disk object with the same chain ID as the "stale" image disk object.

Image controller 112 sets the size field to the necessary size indicated by the "stale" image disk object's error message or executes an algorithm to compute a new size (e.g., old size×1.5). Image controller 112 sets the state of the new image disk object to "allocating," signaling that the new image disk object is either not yet pointing to a CI disk or is pointing to an empty CI disk, After step 738, the process ends.

At step 740, image controller 112 monitors Kubernetes master 104 for a "pulling" image disk object with a CI disk pointer. If image controller 112 found such an image disk object at step 742, it is determined that the image fetching task succeeded and the process moves to step 744. Otherwise, the process ends.

At step 744, image controller 112 changes the image disk object's state to "ready." As a result, as described below in conjunction with FIG. 8, image controller 112 will later change the states of any image objects pointing to the image disk object to "ready." After step 744, the process ends.

Figure 8:
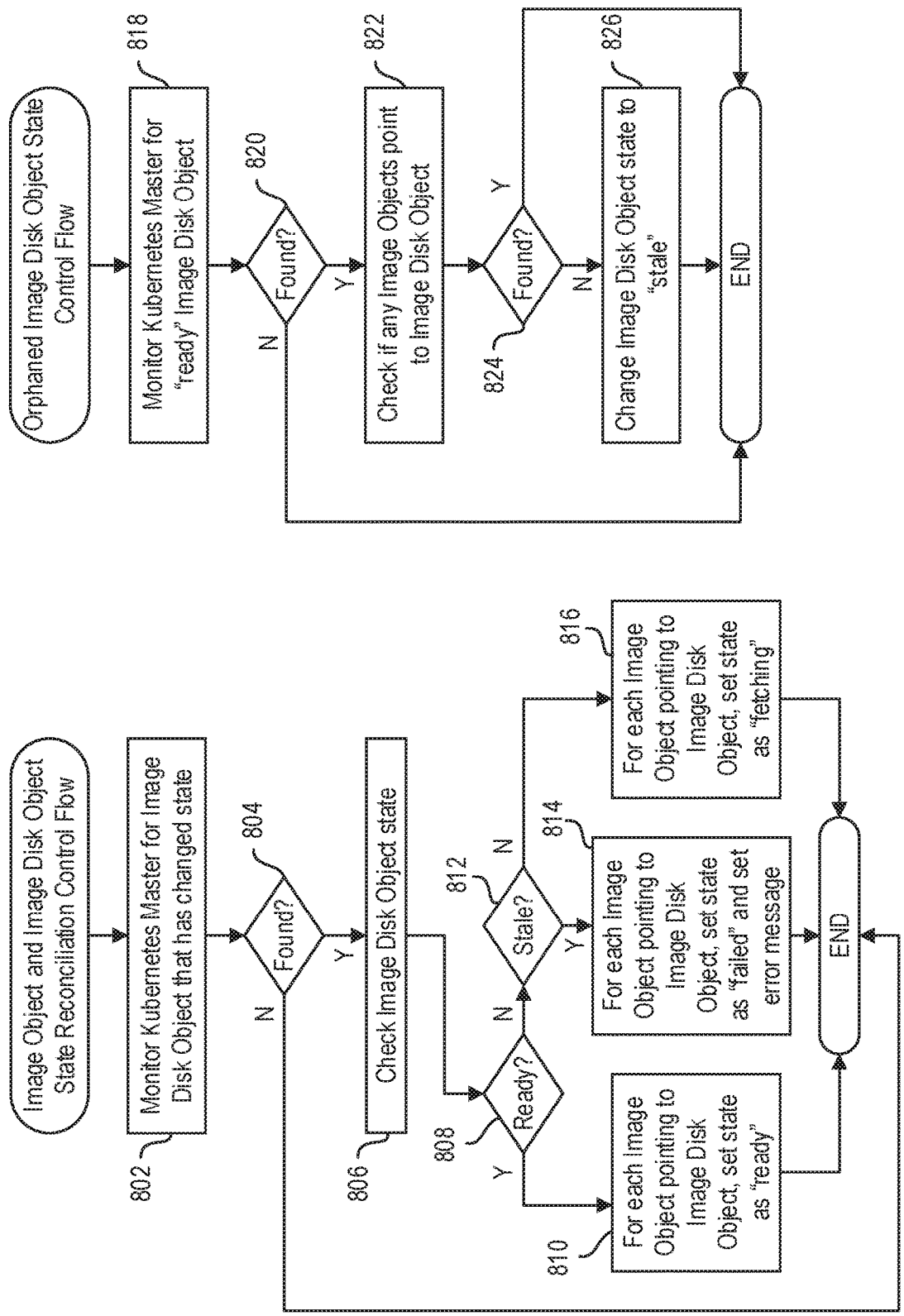
FIG. 8 is a group of flow diagrams illustrating processes of reconciling image object and image disk object states according to embodiments.

FIG. 8 depicts two flow diagrams illustrating processes of reconciling image object and image disk object states according to embodiments. Image controller 112 performs the steps of FIG. 8.

At step 802, image controller 112 monitors Kubernetes master 104 for an image disk object whose state changed. For example, an image disk object could contain a flag that is set whenever the image disk object's state changes and that is cleared when image controller 112 reconciles the image disk object's state change. If image controller 112 found such an image disk object at step 804, then the process moves to step 806. Otherwise, the process ends.

At step 806, image controller 112 checks the new state of the image disk object. At step 808, if the image disk object's state is "ready," then the process moves to step 810. Otherwise, the process moves to step 812. At step 810, image controller 112 sets the states of any image objects pointing to the image disk object as "ready." After step 810, the process ends.

Step 812 is executed to determine if the image disk object's state is "stale." If so, the process moves to step 814. Otherwise, the process moves to step 816.

At step 814, image controller 112 sets the states of any image objects 108 pointing to the image disk object as "failed," and sets the corresponding error message. After step 814, the process ends.

When step 816 is reached, the image disk object's state is neither "ready" nor "stale." Accordingly, the image disk object's state must be either "allocating" or "pulling." Either way, image controller 112 sets the states of any image objects pointing to the image disk object as "fetching." The "fetching" state is an indication that the image object is pointing to an image disk object and the image disk object is either not pointing to a CI disk or pointing to an empty CI disk. After step 816, the process ends.

An orphaned image disk object is an image disk object that points to a populated CI disk, but that does not have any image objects pointing to it. To determine if there are any orphaned image disk objects, at step 818, image controller 112 monitors Kubernetes master 104 for a "ready" image disk object.

At step 820, if image controller 112 found such an image disk object, then the process moves to step 822. Otherwise, the process ends.

At step 822, image controller 112 checks if any image objects point to the "ready" image disk object. If there is any (step 824, Yes), the process ends. Otherwise, it is determined that the "ready" image disk object is an orphaned image disk object and the process moves to step 826. At step 826, image controller 112 changes the image disk object's state to "stale." After step 826, the process ends.

Figure 9:
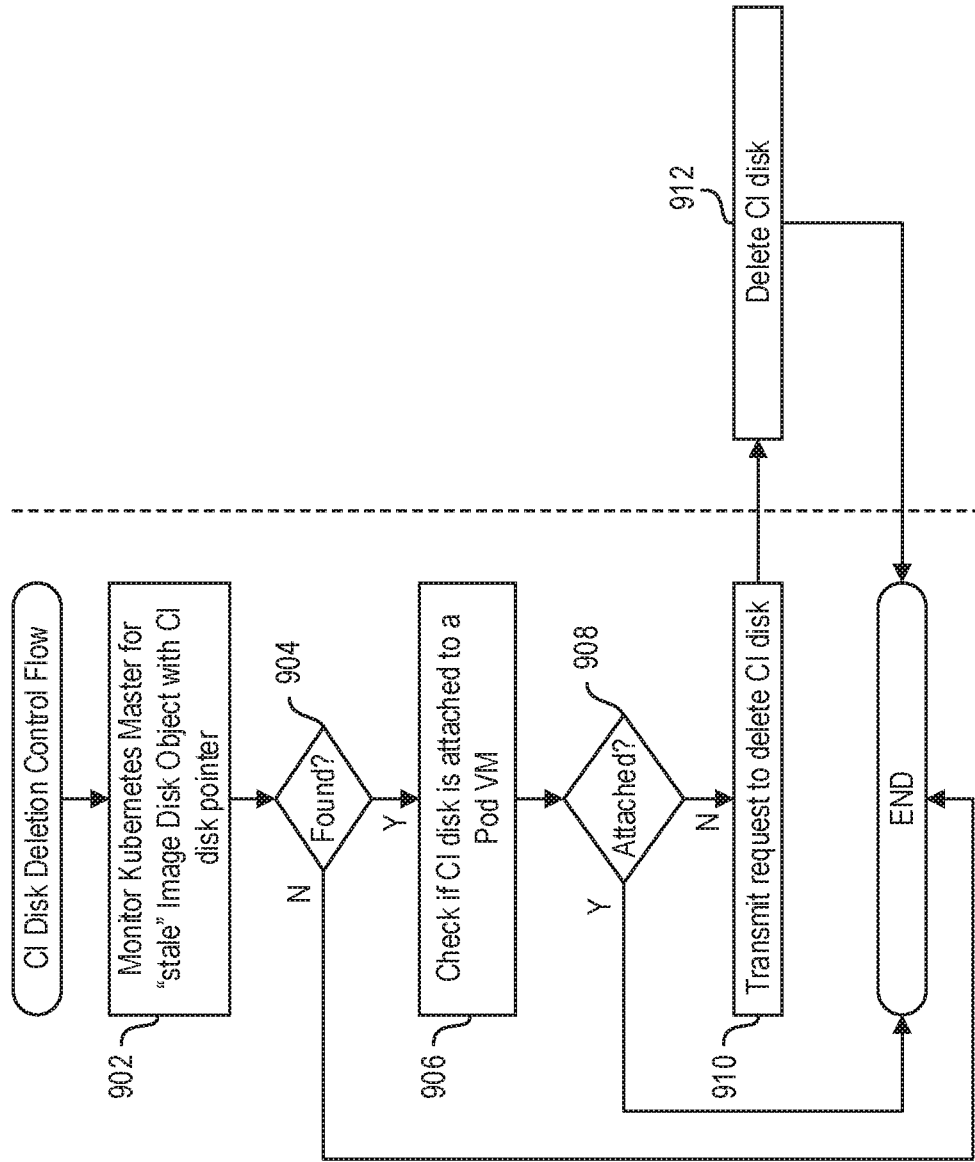
FIG. 9 is a flow diagram illustrating a process of deleting container image disks according to embodiments.

FIG. 9 is a flow diagram illustrating a process of deleting CI disks 172 according to embodiments. At step 902, disk controller 114 monitors Kubernetes master 104 for a "stale" image disk object (i.e., image disk object in the "stale" state) with a CI disk pointer. If disk controller 114 found such an image disk object at step 904, then the process moves to step 906. Otherwise, the process ends.

At step 906, disk controller 114 checks if the CI disk that the "stale" image disk object points to is presently attached to any pod VMs. If the CI disk is not attached to any pod VMs (as determined at step 908), then the process moves to step 910. Otherwise, the process ends. At step 910, disk controller 114 transmits a request to VM management server 116 (e.g., via an API call) to delete the CI disk. At step 912, VM management server 116 deletes the CI disk from shared storage 170. After step 912, the process ends.

According to embodiments, because CI disks 172 that store container images are stored in shared storage 170 that is accessible by all hosts 120 of a duster, a container image that is already stored in shared storage can be retrieved by any pod VM running in any one of hosts 120 if that pod VM has the appropriate permissions to access that container image. As such, the group of CI disks 172 effectively forms a "global cache" from which different hosts of the cluster can retrieve container images without having to access image registry 190. Consequently, even when an instance of the same pod VM is deployed across multiple nodes concurrently, network 180 does not becomes saturated. In addition, the deployment time for a pod PM becomes more deterministic because there is one global cache. As a result, scheduling decisions can be more effectively.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of deploying containers in a clustered container host system comprising a plurality of hosts that share a storage device, said method comprising:
   determining, from pod objects published by a master device of the clustered container host system and accessible by all hosts of the clustered container host system, that a new pod is to be created, wherein each of the hosts includes a virtualization software layer that supports execution of virtual machines (VMs) in the hosts, including pod VMs that have implemented therein an operating system and a container engine that runs on top of the operating system and supports execution of containers within the respective pod VM;
   creating the new pod as a new pod VM; and
   spinning up one or more containers in the new pod VM using images of containers previously spun up in another pod VM, wherein the images of the containers previously spun up in said another pod VM are stored in the storage device, wherein
   the images of the containers previously spun up in said another pod VM are stored in the storage device in separate virtual disks.

2. The method of claim 1, wherein the new pod VM is running in a first host in the plurality of hosts and said another pod VM is running in a second host in the plurality of hosts.

3. The method of claim 2, wherein the plurality of hosts is managed as a Kubernetes cluster.

4. The method of claim 3, wherein the plurality of hosts is managed as a cluster by a virtual machine management server that manages all VMs in the hosts and provisions the virtual disks for the VMs in the storage device.

5. The method of claim 1, wherein the new pod VM is in a first namespace associated with a first user and said another pod VM is in a second namespace associated with a second user.

6. The method of claim 5, wherein the images of containers previously spun up in said another pod VM are running in said another pod VM.

7. The method of claim 6, wherein access to the stored images of the containers running in said another pod VM by the new pod VM and said another pod VM is managed using image disk objects that each point to one of the stored images of the containers running in said another pod VM, first image objects associated with the first namespace that each point to one of the image disk objects, and second image objects associated with the second namespace that each point to one of the image disk objects.

8. The method of claim 5, wherein the images of containers previously spun up in said another pod VM are no longer running in said another pod VM.

9. The method of claim 8, wherein access to the stored images of the containers running in said another pod VM by the new pod VM and said another pod VM is managed using image disk objects that each point to one of the stored images of the containers running in said another pod VM, first image objects associated with the first namespace that each point to one of the image disk objects, and second image objects associated with the second namespace that each previously pointed to one of the image disk objects and now point to none of the image disk objects.

10. A non-transitory computer readable medium comprising instructions to be executed in a computing device to cause the computing device to carry out a method of deploying containers in a clustered container host system with a shared storage device, said method comprising:
   determining, from pod objects published by a master device of the clustered container host system and accessible by all hosts of the clustered container host system, that a new pod is to be created, wherein each of the hosts includes a virtualization software layer that supports execution of virtual machines (VMs) in the hosts, including pod VMs that have implemented therein an operating system and a container engine that runs on top of the operating system and supports execution of containers within the respective pod VM;
   creating the new pod as a new pod VM; and
   spinning up one or more containers in the new pod VM using images of containers previously spun up in another pod VM, wherein the images of the containers previously spun up in said another pod VM are stored in the shared storage device, wherein
   the images of the containers previously spun up in said another pod VM are stored in the shared storage device in separate virtual disks.

11. The non-transitory computer readable medium of claim 10, wherein the new pod VM is running in a first host in the plurality of hosts and said another pod VM is running in a second host in the plurality of hosts.

12. The non-transitory computer readable medium of claim 10, wherein the new pod VM is in a first namespace associated with a first user and said another pod VM is in a second namespace associated with a second user.

13. The non-transitory computer readable medium of claim 12, wherein the images of containers previously spun up in said another pod VM are running in said another pod VM.

14. The non-transitory computer readable medium of claim 13, wherein access to the stored images of the containers running in said another pod VM by the new pod VM and said another pod VM is managed using image disk objects that each point to one of the stored images of the containers running in said another pod VM, first image objects associated with the first namespace that each point to one of the image disk objects, and second image objects associated with the second namespace that each point to one of the image disk objects.

15. The non-transitory computer readable medium of claim 12, wherein the images of containers previously spun up in said another pod VM are no longer running in said another pod VM.

16. The non-transitory computer readable medium of claim 15, wherein access to the stored images of the containers running in said another pod VM by the new pod VM and said another pod VM is managed using image disk objects that each point to one of the stored images of the containers running in said another pod VM, first image objects associated with the first namespace that each point to one of the image disk objects, and second image objects associated with the second namespace that each previously pointed to one of the image disk objects and now point to none of the image disk objects.

17. A clustered container host system comprising:
a storage device; and
a plurality of hosts that share the storage device, wherein the hosts each include a virtualization software layer that supports execution of virtual machines (VMs) therein, and one or more VMs include pod VMs that have implemented therein an operating system and a container engine that runs on top of the operating system and supports execution of containers within the respective pod VM, wherein
at least one of the hosts is programmed to execute a method of deploying containers, said method comprising:
determining, from pod objects published by a master device of the clustered container host system and accessible by all hosts of the clustered container host system, that a new pod is to be created;
creating the new pod as a new pod VM; and
spinning up one or more containers in the new pod VM using images of containers previously spun up in another pod VM, wherein the images of the containers previously spun up in said another pod VM are stored in the storage device, and wherein
the images of the containers previously spun up in said another pod VM are stored in the storage device in separate virtual disks.

18. The clustered container host system of claim 17, wherein the plurality of hosts is managed as a Kubernetes cluster and as a VM host cluster by a virtual machine management server that manages all VMs in the hosts and provisions the virtual disks for the VMs in the storage device.

* * * * *